Jan. 3, 1933.  W. F. HOERLE  1,893,140
PROCESS OF MAKING ICE SKATES
Original Filed June 1, 1931
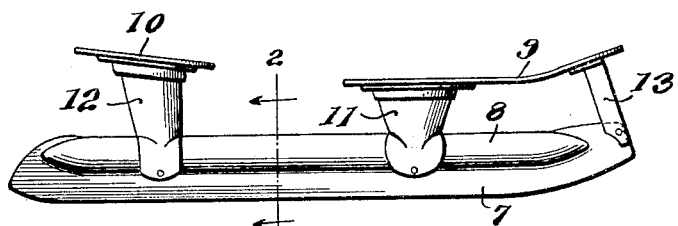
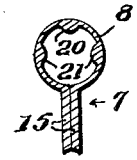
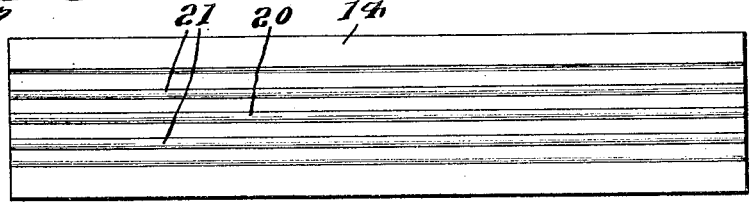
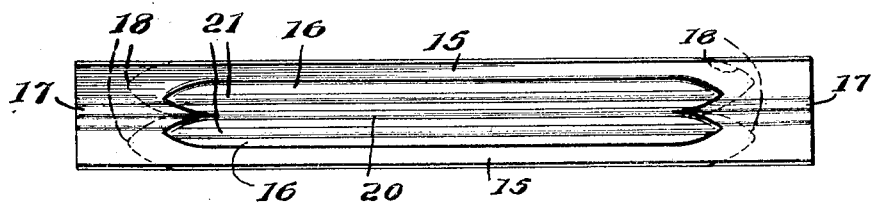
Inventor
William F. Hoerle,
By
Attorney Patented Jan. 3, 1933

1,893,140

UNITED STATES PATENT OFFICE

WILLIAM F. HOERLE, OF TORRINGTON, CONNECTICUT, ASSIGNOR TO UNION HARDWARE COMPANY, OF TORRINGTON, CONNECTICUT, A CORPORATION OF CONNECTICUT

PROCESS OF MAKING ICE SKATES

Original application filed June 1, 1931, Serial No. 541,377. Divided and this application filed May 25, 1932. Serial No. 613,380.

My invention relates particularly to the production of what are commonly termed tubular skates. In the past it has been customary to form such structures out of two or more pieces of metal riveted or welded together. These constructions, of course, have the natural disadvantages of devices made of two or more parts, i. e., expense of manufacture and the provision of cracks and seams which are likely to rust and open up.

One object of my invention is to produce a skate which is light and durable.

Another object is to provide a construction which can be made more economically.

In developing the invention I have found it possible to make the tubular body and the runner out of a single flat strip of metal, stamped and folded together, and with the edges united to form the runner. I have also been able to make such a skate out of a low carbon steel which can be readily drawn and shaped and then carbonized, tempered and annealed. By such a process it is possible to produce a runner which is to a large extent self-sharpening.

Fig. 1 is a side view of a skate made according to my invention.

Fig. 2 is a cross section of the tubular body and runner on the plane of the line 2—2 of Fig. 1 but on an enlarged scale.

Fig. 3 is a plan view of the blank from which the body of the skate is to be made.

Fig. 4 is a cross sectional view of the blank.

Fig. 5 is a plan view of the blank partially formed.

Fig. 6 is an end view of the same.

The body of the skate consists of the runner 7 and the tubular portion 8 formed out of a single strip of metal. Such a skate will be provided with suitable toe plate 9 and heel plate 10 connected to the body by supports such as 11, 12 and 13 in any suitable manner.

The blank may be of a flat strip of metal 14, such as steel, capable of being drawn, tempered and annealed. Such a strip may be of uniform thickness and of suitable composition either of high carbon steel or alloy steel.

My method of manufacture, however, makes it possible and desirable to use a comparatively cheap and soft low carbon steel containing say from 10 to 20 points of carbon.

The blank is formed so that the edges 15 are brought together to form the runner and welded or riveted at a number of points, for instance, by spot welding or line welding. The tubular portion of the body is formed by stamping longitudinal grooves 16 into the blank as shown in Figs. 5 and 6. At the same time the central portions of the ends are grooved as at 17. An additional forming operation brings the flanges 15—15 together to form the runner 7 and produces the tubular portion 8 which affords the necessary longitudinal reinforcement.

When a low carbon steel is used it can be readily carbonized by careful treatment so as to increase the carbon content up to say 80 points or more, which will permit proper hardening, tempering and annealing. It will be understood, of course, that the ends of the blanks are trimmed off as at 18 to any desired shape either before or after the forming operation.

The process of manufacture as above described makes it possible more readily to reduce the thickness of the stock between the edges 15—15, for instance, by rolling or swaging while the steel is soft and in this way provide a very light tubular portion with an adequately thick runner. For instance, for a hockey skate I may employ a blank five hundredths of an inch thick and reduce the central portion 19 to one-half this thickness. Such a construction would provide a runner with a cutting edge one-tenth of an inch thick.

Of course, I do not wish it understood that the invention is limited to the use of any specific thickness of stock. Racing skates may be made of still thinner stock.

According to the use of my invention it is possible to greatly reduce the cost of the skate and also to reduce the weight and still afford adequate strength and durability.

When the skate body is formed of soft steel and then carbonized properly the outer surface will be somewhat harder than the interior and consequently when the skate is ground it will leave the cutting edges somewhat harder than the center. Such a construction is in effect more or less self-sharpening inasmuch as the softer central portion will wear away more rapidly than the edges.

According to my invention it is possible to provide longitudinal reinforcing ribs such as 20 and 21 in the blank which materially increase the strength of the tubular portion with the addition of a minimum amount of metal.

It will be understood that the carbonizing of the body would take place prior to the attachment of the toe and heel plates and their supports. The skates may be finished in any suitable manner.

A skate blade can be made according to my invention out of such thickness of metal as is commonly employed in making the tubular reinforcement, and in such case will have much greater strength than the old form. In fact it is possible by my method to make a skate blade which will be not only stronger but lighter than those heretofore made.

This application is a division from my application No. 541,377, filed June 1, 1931.

I claim:

1. The method of making a skate blade which comprises longitudinally grooving a blank strip to form integrally connected semi-tubular portions with outwardly flaring edges and then forming the grooved portion into a tube and then directly uniting the edges to form the runner.

2. The method of forming a skate blade which comprises forming a tube from the longitudinal central portion of a soft steel strip and uniting the edges of the strip to form the runner, then carbonizing the blade to increase the percentage of carbon in the surface, then hardening the blade and then tempering it.

3. The method of forming a skate blade which comprises reducing the thickness of the longitudinal central portion of a soft steel blank, then forming the central part into a tube and uniting edges to form the runner, then carbonizing the blade, then hardening the blade, and then tempering it.

4. The process of making a tubular ice skate blade which comprises bending a soft steel strip along its central portion and forming a tubular reinforcement with projecting edges, then welding the edges together to form runners, and then carbonizing, hardening and tempering the blade.

5. The method of forming a skate blade which comprises first grooving a soft steel strip longitudinally along its central portion to form integrally connected semi-tubular portions with outwardly flaring edges, then bending the edges toward each other and forming the semi-tubular portion into a tubular reinforcement with parallel edges, then uniting the edges, then carbonizing the steel to increase its carbon content at least in the edges, then hardening the edges and then tempering them.

WILLIAM F. HOERLE.